United States Patent Office 2,734,260
Patented Feb. 14, 1956

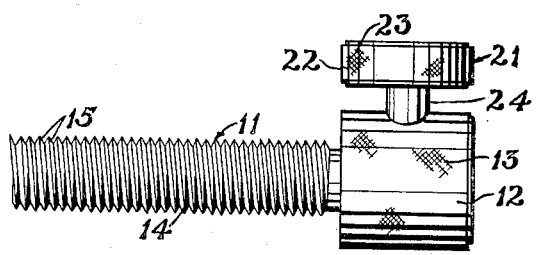
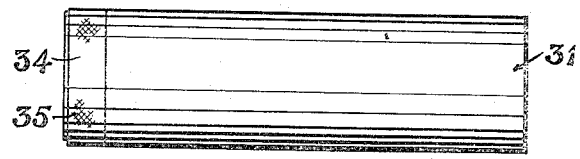
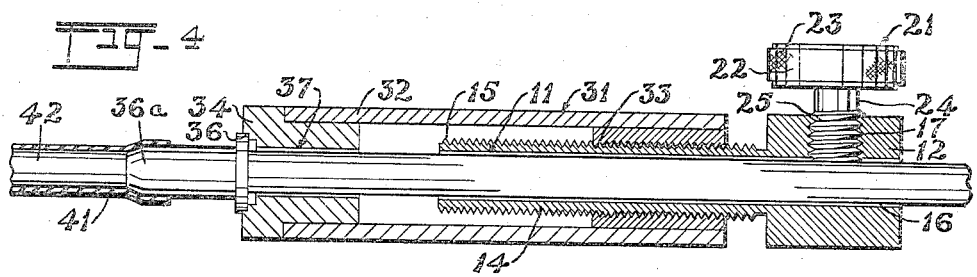
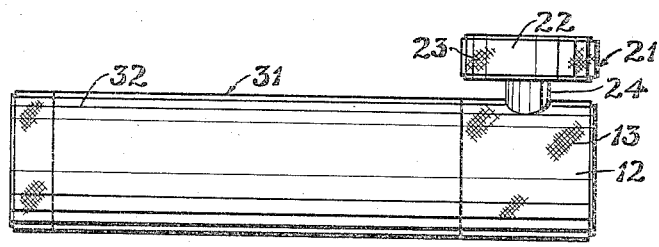

2,734,260
TOOL

Oliver A. Wyckoff, Bellmore, N. Y.

Application June 23, 1952, Serial No. 295,139

1 Claim. (Cl. 29—203)

(Granted under Title 35, U. S. Code (1952), sec. 266)

The invention herein described may be manufactured and used by or for the Government of the United States of America for governmental purposes without the payment of any royalties thereon or therefor.

This invention concerns a tool and in particular concerns a tool for forcing a ferrule under the rubber covering or jacket of a coaxial cable or other electrical conductor of similar construction.

When installing special types of plugs and end seals in connection with coaxial cable, it is necessary to force a ferrule under the rubber covering or jacket of the coaxial cable. This is done by placing the ferrule in axial alignment with the coaxial cable and then forcing the ferrule in an axial direction along the cable so that the leading edge of the ferrule is underneath the rubber covering or jacket of the coaxial cable and over the Belden braid. In attempting to force the ferrule axially along the cable into assembled position, difficulty is encountered in maintaining the ferrule in proper axial alignment and also diffculty is encountered in applying an axial force that is uniformly distributed circumferentially about the ferrule. When the force applied circumferentially to the ferrule is not uniformly distributed around the circumference the ferrule cants and renders proper assembly impossible.

The present invention overcomes these difficulties by providing a tool that during assembly of the ferrule under the covering of the coaxial cable locates the ferrule in axial alignment with the coaxial cable. The tool also applies an axial force that is distributed uniformly about the circumference of the ferrule to force the ferrule beneath the covering of the coaxial cable.

An object of the invention is to provide a tool.

Another object is to provide a tool for forcing a ferrule under the rubber covering or jacket of a coaxial cable.

Another object is to provide a tool of this type that locates the ferrule and proper axial alignment with the coaxial cable during assembly.

Another object is to provide a tool of this type that applies to the ferrule an axial force that is distributed uniformly about the circumference of the ferrule during assembly.

Other object and many of the attendant advantages of this invention will be readily appreciated as the same becomes better understood by reference to the following detailed description when considered in connection with the accompanying drawings wherein:

Fig. 1 is an elevation of the body member and thumb screw assembled therein.

Fig. 2 is an elevation of the traveler member.

Fig. 3 is an elevation of the body member and thumb screw assembled together with the traveler member, and Fig. 4 is a longitudinal section of the body member and thumb screw assembled with respect to the traveler member.

In the drawings there is shown a body member 11 preferably formed of metal such as steel and including a cylindrical hub 12 having a knurled external surface 13 and an elongated stem 14 having threads 15, stem 14 being preferably formed integrally with hub 12. Hub 12 and stem 14 are formed with a bore 16 extending therethrough. Hub 12 is provided with a second bore 17 substantially perpendicular to bore 16 and extending from bore 16 to the outer surface of hub 12.

There is provided a thumb screw 21 formed preferably of metal such as steel and having a head 22 provided with an external knurled surface 23 and a shank 24 formed with threads 25. Thumb screw 21 is screwed into hub 12 with threads 25 in engagement with threads 17. When screwed all the way into hub 12, thumb screw 21 projects into bore 16 and when unscrewed relative to hub 12 thumb screw 21 is retracted from bore 16.

There is a traveler member 31 preferably formed of plastic. Traveler member 31 includes a barrel 32 provided with internal threads 33 at one end thereof whereby barrel 32 is screwed upon stem 14 with threads 33 in engagement with threads 15. The end of barrel 32 remote from threads 33 is fitted with a cap 34 having a knurled external surface 35. Cap 34 is formed to define a seat 36 for receiving a ferrule 36a. Cap 34 is provided with a bore 37 in axial alignment with bore 16 whereby, when the tool is assembled as shown in Fig. 4, there is a bore extending completely from hub 12 through stem 14, barrel 32 and cap 34.

In operation the tool is conditioned for use by screwing traveler member 31 closed upon body member 11 with the threaded end of barrel 32 in abutment with hub 12 as shown in Fig. 3. The rubber cover, or jacket 41 of the coaxial cable 42 is then removed for a distance slightly greater than the overall length of the tool as shown in Fig. 4. Ferrule 36a is then placed in seat 36 and the stripped coaxial cable is fed through the tool from the left to right as seen in Fig. 4. When the stripped cable is inserted completely through the tool and completely through hub 12, thumb screw 21 is tightened to lock the stripped cable in fixed position relative to body member 11. Traveler member 31 is then turned so that threads 33 turn upon threads 15 to cause the traveler member 31 to move axially to the left as seen in Fig. 4. Movement of traveler member 31 to the left forces the ferrule in seat 36 to the left relative to the stationary coaxial cable. The force exerted by traveler member 31 on the ferrule is uniformly distributed about the circumference of the ferrule and results in the ferrule being forced evenly along the coaxial cable and into assembled position under the rubber covering or jacket of the coaxial cable.

Obviously many modifications and variations of the present invention are possible in the light of the above teachings. It is therefore to be understood that within the scope of the appended claim the invention may be practiced otherwise than as specifically described.

I claim:

A tool comprising a body member, said member including a hub and an elongated stem integral with said hub and extending away therefrom, external threads formed on said stem, said hub and said stem being formed with a first bore extending axially therethrough, said hub being formed with a second bore substantially perpendicular to the first bore and extending from the first bore to the outer surface of said hub; a thumb screw member threaded into the second bore and adapted for projection into and retraction from the first bore; and a traveler member mounted on said body member, said traveler member including a barrel, said barrel being internally threaded at one end thereof and threadedly engaging said stem for traveling movement axially along said stem, and an annular cap secured to the other end of said barrel axially thereof, the inside diameter of said cap being equal to that of the first bore of said body member, the end of said cap directed outwardly of said barrel being formed with an axial cylindrical recess to define an axial antifriction seat, the axis of the first bore of said body member, the axis of said cap, and the axis of the cylindrical recess in said cap being in alignment.

References Cited in the file of this patent

UNITED STATES PATENTS

| | | |
|---|---|---|
| 160,696 | Morse | Mar. 9, 1875 |
| 389,441 | Callahan | Sept. 11, 1888 |
| 1,316,753 | Williams | Sept. 23, 1919 |
| 1,631,889 | Rappley | June 7, 1927 |
| 1,855,116 | Prajer | Apr. 19, 1932 |
| 2,160,395 | Wettlaufer | May 30, 1939 |